United States Patent
Kim et al.

(10) Patent No.: US 8,085,628 B2
(45) Date of Patent: Dec. 27, 2011

(54) FOCUS SERVO CONTROLLING METHOD AND APPARATUS AND OPTICAL DISK DRIVE USING THE FOCUS SERVO CONTROLLING METHOD

(75) Inventors: Seung-hoon Kim, Daejeon (KR); Kwan-ho Chun, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 392 days.

(21) Appl. No.: 12/285,507

(22) Filed: Oct. 7, 2008

(65) Prior Publication Data

US 2009/0092020 A1    Apr. 9, 2009

(30) Foreign Application Priority Data

Oct. 8, 2007    (KR) .................... 10-2007-0100861

(51) Int. Cl.
*G11B 7/00*    (2006.01)
(52) U.S. Cl. ............... 369/44.27; 369/53.23; 369/44.25
(58) Field of Classification Search .................... None
See application file for complete search history.

(56) References Cited

U.S. PATENT DOCUMENTS

| | | | | |
|---|---|---|---|---|
| 2005/0276199 A1* | 12/2005 | Sugai | ...................... | 369/53.22 |
| 2006/0120229 A1* | 6/2006 | Nabeta | ...................... | 369/44.27 |

FOREIGN PATENT DOCUMENTS

| | | |
|---|---|---|
| JP | 07-272287 | 10/1995 |
| JP | 2002-109754 | 4/2002 |
| JP | 2002-150571 | 5/2002 |
| JP | 2003-051127 | 2/2003 |
| JP | 2005-310234 | 11/2005 |
| KR | 10-2003-0056086 | 12/2001 |
| KR | 10-2005-0066513 | 12/2003 |
| KR | 10-2005-0066513 | 6/2005 |

OTHER PUBLICATIONS

Korean Office Action dated Sep. 23, 2008, issued in corresponding Korean Patent Application No. 10-2007-0100861.

\* cited by examiner

*Primary Examiner* — Joseph Haley
(74) *Attorney, Agent, or Firm* — NSIP Law (57) ABSTRACT

A method and apparatus for controlling a focus servo of an optical disk drive is provided. The focus servo controlling method includes the operations of, when an operating mode enters into a focus pull-in mode, detecting a period of time that satisfies a first threshold condition, the first threshold condition set to determine a duration in which a focal point of an optical signal emitted from a pickup is passing through a cover layer of a disk, the determination made by using a first signal proportional to a detected portion of an optical signal reflected by the disk, and preventing focus servo control from being performed during a detected period of time that first satisfies the first threshold condition since the operating mode entered into the focus pull-in mode.

22 Claims, 8 Drawing Sheets

FOCUS SERVO CONTROLLING METHOD AND APPARATUS AND OPTICAL DISK DRIVE USING THE FOCUS SERVO CONTROLLING METHOD

CROSS-REFERENCE TO RELATED APPLICATIONS

This application claims the priority benefit of Korean Patent Application No. 10-2007-0100861, filed on Oct. 8, 2007, in the Korean Intellectual Property Office, the disclosure of which is incorporated herein in its entirety by reference.

BACKGROUND

1. Field

The present invention relates to a method and apparatus for controlling a disk drive servo, and more particularly, a method and apparatus for controlling a focus servo of an optical disk drive.

2. Description of the Related Art

Optical disks, which are used as recording media of optical disk drives, can be classified as compact discs (CDs), digital versatile discs (DVDs), and next-generation discs such as Blue-ray discs (BDs) and high-density DVDs (HD DVDs). Data is recorded to and reproduced from BDs using a blue laser having a short wavelength, and thus BDs have a drastically increased storage capacity compared with DVDs.

In order to record data to or reproduce data from an optical disk, an optical disk drive needs to perform focus servo control so that a beam projected by a pickup can be focused on a recording surface of the optical disk. Focus servo control can be roughly divided into a focus pull-in operation and a focus control operation.

In the focus pull-in operation, when a focus servo control loop is turned off, a location of a recording surface on a disk is searched for by moving an objective lens of a pickup toward the top surface of the disk. In the focus control operation, after the recording surface of the disk is found, the focus servo loop is turned on and then the position of the objective lens of the pickup is controlled so that a beam projected by the pickup is accurately focused on the recording surface of the disk.

Korean Patent Publication No. 1991-0008668 discloses a conventional focus pull-in method.

According to a conventional art, when a large level of a signal for determining a point in time at which a focus servo is enabled is generated from a cover layer of a disk, the cover layer of the disk may be misinterpreted as a recording layer thereof, and thus focus servo control may pull in the cover layer of the disk.

SUMMARY

The present invention provides a focus servo controlling method in which execution of focus servo control on the cover layer of a disk is prevented during a focus pull-in operation by using signals generated from an optical signal reflected by the disk.

The present invention also provides an optical disk drive which controls execution of focus servo control on the cover layer of a disk to be prevented by using signals generated from an optical signal reflected by the disk, during a focus pull-in operation.

According to an aspect of the present invention, there is provided a focus servo controlling method comprising the operations of: detecting a period of time that satisfies a first threshold condition in a focus pull-in mode, the first threshold condition set to determine a duration in which a focal point of an optical signal emitted from a pickup is passing through a cover layer of a disk, the determination made by using a first signal proportional to a detected portion of an optical signal reflected by the disk; and preventing focus servo control from being performed during a detected period of time that first satisfies the first threshold condition since the operating mode entered into the focus pull-in mode.

The first signal may comprise a sum signal obtained by summing signals detected by an optical detector of a pickup.

The signals detected by the optical detector of the pickup may be at least one of a main bean and a sub beam.

The period of time that satisfies the first threshold condition may comprise a period between a point in time at which a magnitude of the first signal increases and reaches a first threshold value set to determine a point in time at which the cover layer of the disk starts and a point in time at which the magnitude of the first signal decreases and reaches a second threshold value set to determine a point in time at which the cover layer of the disk ends, wherein the second threshold value is less than the first threshold value.

The period of time that satisfies the first threshold condition may comprise a period between the point in time at which the magnitude of the first signal increases and reaches the first threshold value set to determine a point in time at which the cover layer of the disk starts and a point in time at which a certain period of time has lapsed since the point in time at which the magnitude of the first signal increases and reaches the first threshold value.

The focus servo controlling method may further include the operation of starting focus servo control when it is determined using the first signal and a focus error signal that the focal point of the optical signal emitted from the pickup reaches a recording layer of the disk, after the lapse of the period of time that first satisfies the first threshold condition.

The focus servo control may be performed at a point in time at which each of the first signal and the focus error signal satisfies a second threshold condition and a third threshold condition which are set to determine a duration in which the focal point of the optical signal emitted from the pickup is passing through the recording layer of the disk.

The second threshold condition may comprise a condition in which the magnitude of the first signal becomes equal to or greater than a third threshold value set to determine a point in time at which the recording layer of the disk starts.

The second threshold condition may comprise a condition in which the magnitude of the first signal becomes equal to or greater than the third threshold value and after the lapse of a certain period of time becomes equal to or greater than a fourth threshold value set to be greater than the third threshold value.

The third threshold condition may comprise a condition in which the magnitude of the focus error signal becomes equal to or greater than a fifth threshold value set to determine that the focus error signal is generated from the recording layer of the disk and then becomes less than or equal to a sixth threshold value set to be less than the fifth threshold value.

According to another aspect of the present invention, there is provided a focus servo controlling apparatus comprising: a level detection unit to detect a magnitude of a first signal proportional to a detected portion of an optical signal reflected by a disk in a focus pull-in mode; a first comparison unit to compare the magnitude of the first signal detected by the level detection unit with a first threshold value and to generate a first state signal at the moment when the magnitude of the first signal increases and reaches the first threshold value; a second comparison unit to compare a magnitude of the first signal detected by the level detection unit since the generation of the first state signal with a second threshold value and to generate a second state signal at the moment when the magnitude of the first signal decreases and reaches the second threshold value; and a focus servo blocking period determination unit to control focus servo control to be prevented from occurring during a period between a point in time at which the first state signal is initially generated and a point in time at which the second state signal is initially generated.

According to another aspect of the present invention, there is provided a focus servo controlling apparatus comprising: a level detection unit to detect a magnitude of a first signal proportional to a detected portion of an optical signal reflected by a disk in a focus pull-in mode; a first comparison unit to compare the magnitude of the first signal detected by the level detection unit with a first threshold value and to generate a first state signal at the moment when the magnitude of the first signal increases and reaches the first threshold value; a counter to count the number of clock signals generated since the point in time at which the first state signal is generated; and a focus servo blocking period determination unit to control focus servo control to be prevented from occurring during a period between a point in time at which the first state signal is initially generated and a point in time at which the value of the counter reaches a predetermined value.

According to another aspect of the present invention, there is provided a focus servo controlling apparatus comprising: a cover layer period detection unit to generate a first control signal during a period in which a focal point of an optical signal emitted from a pickup is passing through a cover layer of a disk, by using a first signal proportional to a detected portion of an optical signal reflected by the disk in a focus pull-in mode; a recording layer detection unit to generate a second control signal during a period in which the focal point of the optical signal emitted from the pickup is approaching a recording layer of the disk, by using the first signal; a focus servo enable detection unit to generate a third control signal at a focus servo enable point in time, by using a focus error signal; and a focus servo enable determination unit to prevent focus servo control from being performed regardless of generations of the second and third control signals while the first control signal is being generated, and to perform focus servo control when the third control signal is generated while the second control signal is being generated without generation of the first control signal.

The cover layer period detection unit comprises: a level detection unit to detect a magnitude of the first signal in the focus pull-in mode; a first comparison unit to compare the magnitude of the first signal detected by the level detection unit with a first threshold value and to generate a first state signal at the moment when the magnitude of the first signal increases and reaches the first threshold value; a second comparison unit to compare a magnitude of the first signal detected by the level detection unit since the generation of the first state signal with a second threshold value set to be less than the first threshold value and generating a second state signal at the moment when the magnitude of the first signal decreases and reaches the second threshold value; and a focus servo blocking period determination unit to generate the first control signal during a period between a point in time at which the first state signal is initially generated and a point in time at which the second state signal is initially generated.

The cover layer period detection unit comprises: a level detection unit to detect a magnitude of the first signal in a focus pull-in mode; a first comparison unit to compare the magnitude of the first signal detected by the level detection unit with a first threshold value and to generate a first state signal at the moment when the magnitude of the first signal increases and reaches the first threshold value; a counter to count the number of clock signals generated since the point in time at which the first state signal is generated; and a focus servo blocking period determination unit to generate the first control signal during a period between a point in time at which the first state signal is initially generated and a point in time at which the value of the counter reaches a predetermined value.

The recording layer detection unit may comprise: a level detection unit to detect a magnitude of the first signal in the focus pull-in mode; a third comparison unit to compare a magnitude of the first signal detected by the level detection unit after the lapse of the duration in which the first control signal is generated with a third threshold value, and to generate a third state signal at the moment when the magnitude of the first signal increases and reaches the third threshold value; and a fourth comparison unit to compare a magnitude of the first signal detected by the level detection unit since the generation of the third state signal with a fourth threshold value set to be greater than the third threshold value, and to generate the second control signal at the moment when the magnitude of the first signal increases and reaches the fourth threshold value.

The focus servo enable detection unit may comprise: a level detection unit to detect a magnitude of the first signal in the focus pull-in mode; a fifth comparison unit to compare the magnitude of the first signal detected by the level detection unit with a fifth threshold value and to generate a fifth state signal at the moment when the magnitude of the first signal increases and reaches the fifth threshold value; and a sixth comparison unit to compare a magnitude of the first signal detected by the level detection unit since the generation of the fifth state signal with a sixth threshold value set to be less than the fifth threshold value, and to generate the second control signal at the moment when the magnitude of the first signal decreases and reaches the sixth threshold value.

The focus servo enable determination unit may comprise: an inverter to invert a logic state of the first control signal; and an AND gate to generate a focus servo enable signal by logically multiplying an output signal of the inverter and the second and third control signals.

According to another aspect of the present invention, there is provided an optical disk drive comprising: a pickup to project an optical signal to a disk via an objective lens and to detect an optical signal reflected by the disk, the pickup comprising an actuator to move the objective lens according to an actuator driving control signal; a signal processor to generate a focus error signal and a first signal by using optical signals detected by the pickup, wherein the first signal is proportional to a detected portion of the optical signal reflected by the disk; a focus servo determination unit to prevent a focus servo enable signal from being generated while a focal point of the optical signal projected via the objective lens is passing through a cover layer of the disk when the optical disk drive is in a focus pull-in mode, by using the first signal, and to generate the focus servo enable signal when the focal point of the optical signal projected via the objective lens reaches a recording layer of the disk, by using the first signal and the focus error signal; and a controller to generate the actuator driving control signal for moving the objective lens of the pickup in a direction perpendicular to a top surface of the disk, in the focus pull-in mode, and to perform focus servo control when the focus servo enable signal is generated.

The focus servo determination unit may comprise: a cover layer period detection unit to generate a first control signal during a period in which a focal point of an optical signal emitted from a pickup is passing through a cover layer of a disk, by using the first signal, in the focus pull-in mode; a recording layer detection unit to generate a second control signal during a period in which the focal point of the optical signal emitted from the pickup is approaching a recording layer of the disk, by using the first signal; a focus servo enable detection unit to generate a third control signal at a focus servo enable point in time, by using the focus error signal; and a focus servo enable determination unit to generate a focus servo disable signal regardless of generations of the second and third control signals while the first control signal is being generated, and to generate a performing a focus servo enable signal when the third control signal is generated while the second control signal is being generated without generation of the first control signal.

According to another aspect of the present invention, there is provided at least one computer readable medium storing computer readable instructions to implement methods of the present invention.

BRIEF DESCRIPTION OF THE DRAWINGS

These and/or other aspects, features, and advantages will become apparent and more readily appreciated from the following description of exemplary embodiments, taken in conjunction with the accompanying drawings of which.

DETAILED DESCRIPTION OF EMBODIMENTS

Reference will now be made in detail to exemplary embodiments, examples of which are illustrated in the accompanying drawings, wherein like reference numerals refer to the like elements throughout. Exemplary embodiments are described below to explain the present invention by referring to the figures.

Figure 1:
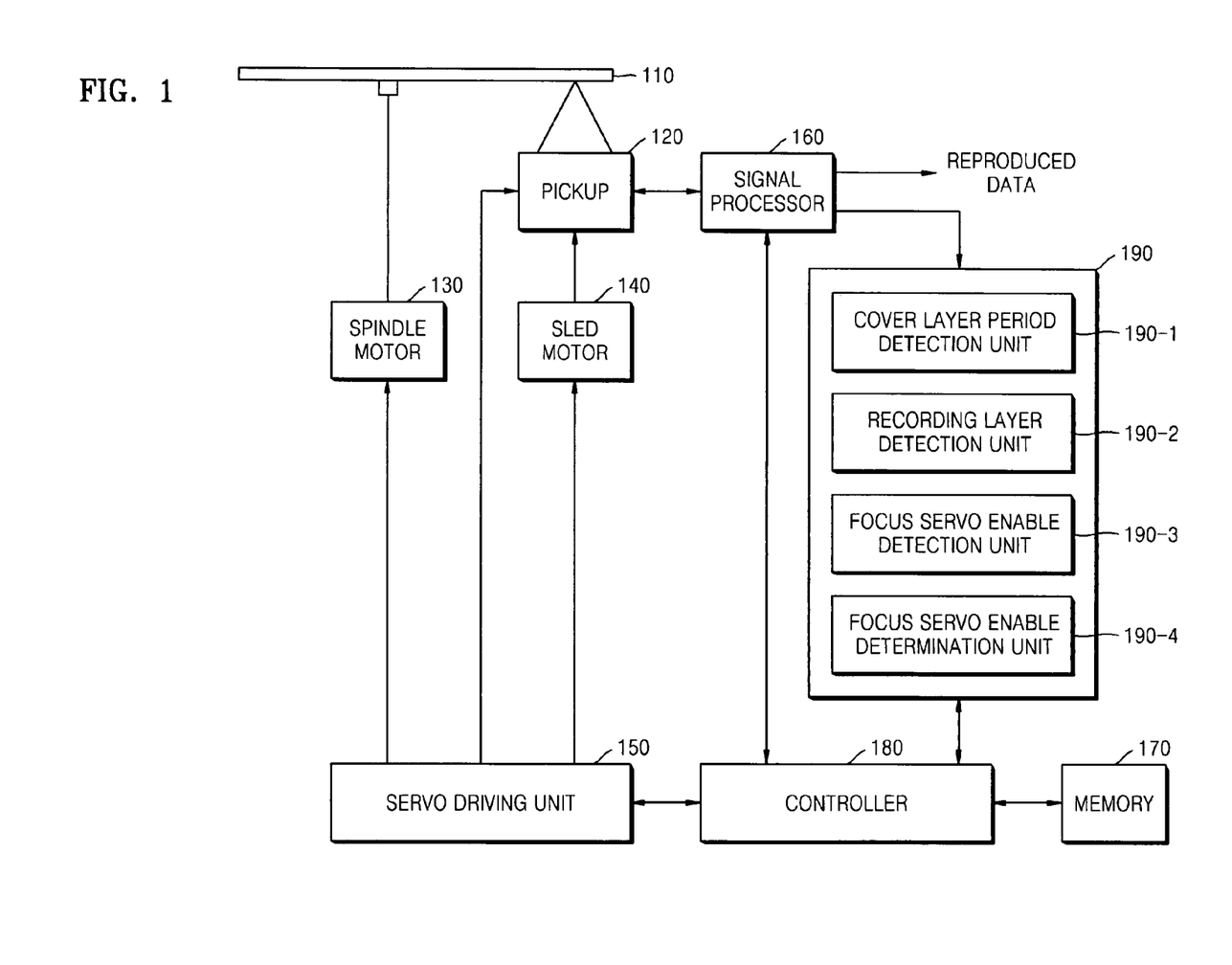
FIG. 1 is a block diagram of an optical disk drive according to an exemplary embodiment of the present invention.

FIG. 1 is a block diagram of an optical disk drive according to an exemplary embodiment of the present invention. Referring to FIG. 1, the optical disk drive according to the current exemplary embodiment of the present invention includes a disk 110, a pickup 120, a spindle motor 130, a sled motor 140, a servo driving unit 150, a signal processor 160, a memory 170, a controller 180, and a focus servo determination unit 190.

The disk 110, serving as a storage medium for use in optical disk drives, may be a compact disc (CD), a digital versatile disc (DVD), a Blue-ray disc (BD), or the like. In particular, BDs can be classified as BDs having a single-layered structure and BDs having a multi-layered structure. Regardless of the type of disk, all optical disks have the same thickness, that is, a thickness of 1.2 mm. However, optical disks have different distances from the cover layers to recording layers according to the type of disk.

Figure 8A:
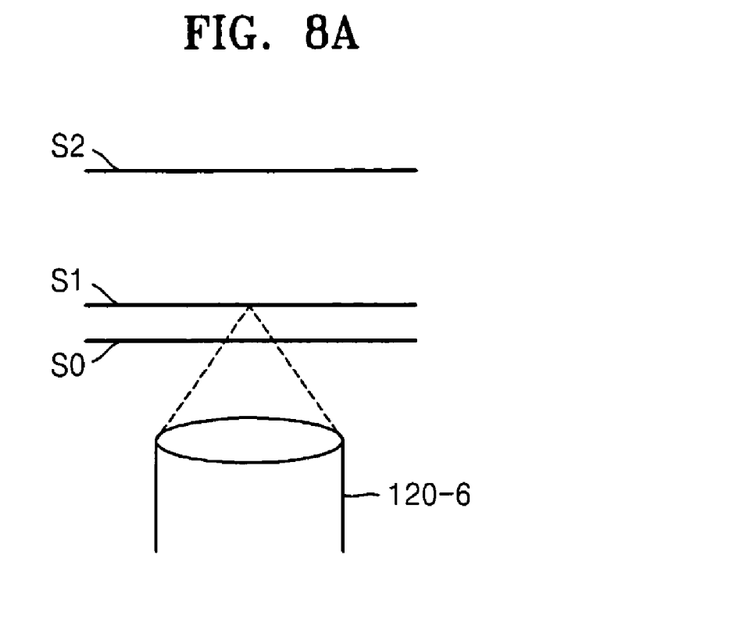
FIG. 8A illustrate a structure of a disk.

FIG. 8A illustrates a structure of a disk having a single recording layer. Referring to FIG. 8A, S0 denotes a cover layer of the disk, S1 denotes the single recording layer of the disk, and S2 denotes a label layer of the disk.

Figure 2:
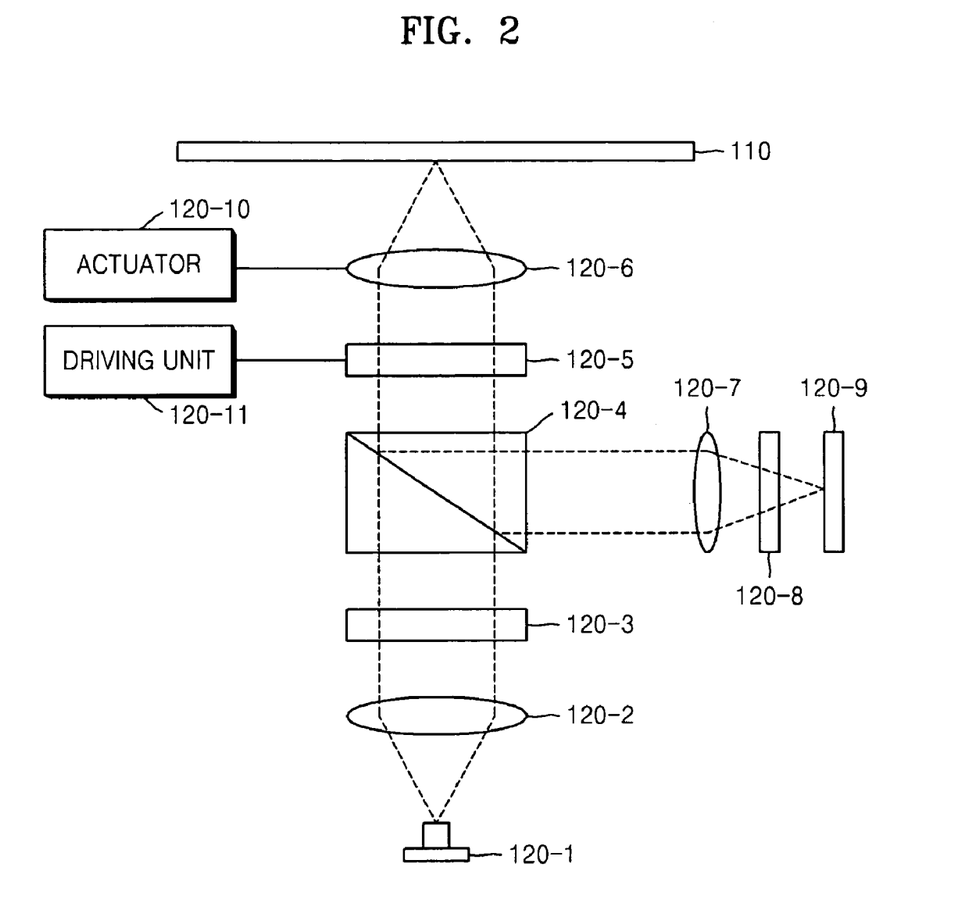
FIG. 2 is a detailed diagram of a pickup of the optical disk drive illustrated in FIG. 1, according to an exemplary embodiment of the present invention.

Referring back to FIG. 1, the pickup 120 projects an optical signal to the disk 110 and detects an optical signal reflected by the disk 110. FIG. 2 is a detailed diagram of the pickup 120, according to an exemplary embodiment of the present invention.

Referring to FIG. 2, the pickup 120 according to the current exemplary embodiment of the present invention includes a light source 120-1, a collimator lens 120-2, a diffraction grating 120-3, a polarization beam splitter 120-4, an aberration correction unit 120-5, an objective lens 120-6, a focusing lens 120-7, a multi-lens 120-8, an optical detector 120-9, an actuator 120-10, and a driving unit 120-11.

In an optical disk drive capable of recording data to or reproducing data from a CD, a DVD, and a BD, the light source 120-1 includes a light source unit for CDs that generates infrared light beams, a light source unit for DVDs that generates red laser beams, and a light source unit for BDs that generates blue laser beams. One of the three light source units is selected according to a result of a disk determination operation. One of the light source units is set as a default light source unit, before the disk determination operation is performed.

A light beam emitted from the light source 120-1 is irradiated to the collimator lens 120-2 and converted into parallel light rays thereby. In order to generate an error signal for servo control, the parallel light rays pass through the diffraction grating 120-3 for side spot generation, and are then incident upon the polarization beam splitter 120-4. Then, the polarization beam splitter 120-4 selects either S-wave light rays or P-wave light rays from the incident parallel light rays and emits the S-wave light rays or P-wave light rays to the aberration correction unit 120-5.

The aberration correction unit 120-5 denotes a unit for correcting a spherical aberration or a coma aberration.

The aberration correction unit 120-5 for correcting spherical aberration, which is well known, may include a pair of a concave lens and a convex lens. In some cases, the aberration correction unit 120-5 is a liquid crystal device. When the aberration correction unit 120-5 includes a pair of a concave lens and a convex lens, it corrects spherical aberration by adjusting the interval between the concave lens and the convex lens.

In the present exemplary embodiment, spherical aberration is corrected by the convex and concave lenses, and the driving unit 120-11 controls the interval between the convex lens and the concave lens of the aberration correction unit 120-5.

The aberration-corrected S-wave light rays or P-wave light rays are incident upon the disk 110 via the objective lens 120-6.

Thereafter, the S-wave light rays or P-wave light rays incident upon the disk 110 are reflected by the disk 110 back to the objective lens 120-6, and are then incident upon the multi-lens 120-8 via the aberration correction unit 120-5, the polarization beam splitter 120-4, and the focusing lens 120-7.

The multi-lens 120-8 has a structure capable of detecting a focus error signal and a tracking error signal from the incident light by so-called astigmatism.

The optical detector 120-9 includes a plurality of photodiodes (not shown) arranged according to a structure required to generate a focus error signal and a tracking error signal. The photodiodes convert incident optical signals into electrical signals.

When the optical disk drive is in a focus pull-in mode, the actuator 120-10 moves the objective lens 120-6 toward a top surface of the disk 110 according to an actuator driving control signal. When focus servo control is performed, the actuator 120-10 moves the objective lens 120-6 in a direction perpendicular to the top surface of the disk 110 according to a focusing control signal generated according to a focus error signal. The actuator 120-10 performs tracking control by moving the objective lens 120-6 in a direction parallel to the top surface of the disk 110 according to a tracking control signal.

Referring back to FIG. 1, the signal processor 160 generates a sum signal RF_SUM, a focus error signal FE, and a tracking error signal by processing the signals output by the optical detector 120-9 of the pickup 120, and performs a series of signal processing operations for restoring the data by processing the sum signal RF_SUM. The sum signal RF_SUM is obtained by summing all of the signals output by the optical detector 120-9 and is proportional to a detected portion of the optical signal reflected by the disk 110.

The controller 180 controls all of the components of the optical disk drive. When a focus pull-in mode is enabled, the controller 180 generates an actuator driving control signal for approaching the objective lens 120-6 of the pickup 120 to a top surface of the disk 110. When a focus servo enable signal is generated, the controller 180 performs focus servo control by operating a focus servo control loop.

The servo driving unit 150 generates driving signals for driving the spindle motor 130 and the sled motor 140, on the basis of a variety of control signals received from the controller 180. In addition, the servo driving unit 150 generates a driving signal for driving the actuator 120-10 of the pickup 120 in order to control focusing and tracking, and a driving signal for driving the driving unit 120-11 of the pickup 120 in order to control aberration correction.

The spindle motor 130 rotates the disk 110, and the sled motor 140 moves the pickup 120 over the disk 110.

The memory 170 stores programs and parameters which are required to control the optical disk drive. Of course, the memory 170 also stores information necessary for focus servo control according to the present invention.

Figure 8B:
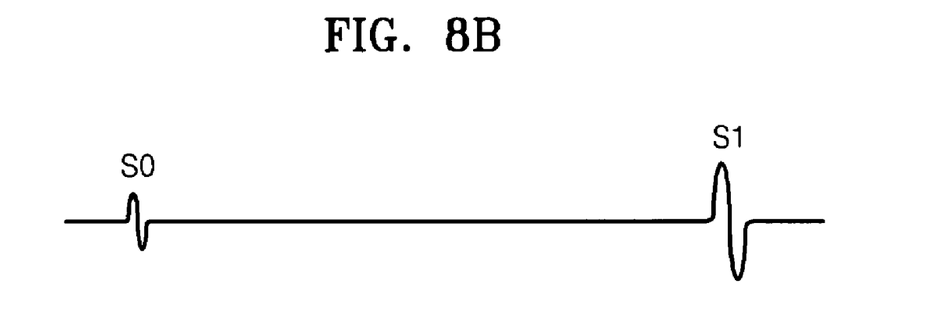
FIG. 8B illustrates a waveform of a focus error signal generated during a focus pull-in operation.
Figure 8C:
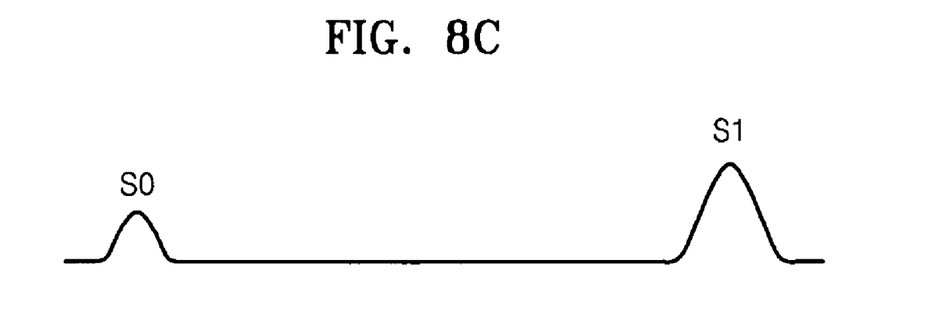
FIG. 8C illustrates a waveform of a sum signal generated during the focus pull-in operation.

FIGS. 8B and 8C illustrate waveforms of a focus error signal and a sum signal, respectively, which are generated when a focal point of the beam passes through the cover layer S0 and recording layer S1 of the disk as the objective lens 120-6 moves over the top surface of the disk 110 while the optical disk drive is performing a focus pull-in operation.

Referring to FIGS. 8B and 8C, the focus error signal and the sum signal are detected from not only the recording layer S1 but also from the cover layer S0. However, according to the types of disks, the specifications of disks, or other factors, a focus error signal and a sum signal having large magnitudes may be generated from the cover layer S0 of the disk. In this case, when a point in time at which focus servo control is to start is determined using the focus error signal and the sum signal, focus servo control may occur on the cover layer S0 of the disk. In order to prevent focus servo control from occurring on the cover layer of a disk, the optical disk drive according to the exemplary embodiment of the present invention illustrated in FIG. 1 includes the focus servo determination unit 190.

In other words, when the optical disk drive is in a focus pull-in mode, the focus servo determination unit 190 prevents focus servo control from being performed while the focal point of the beam projected via the objective lens 120-6 of the pickup 120 is passing through the cover layer of the disk 110, and controls the focus servo control to start at the moment when the focal point of the beam projected via the objective lens 120-6 reaches a recording layer of the disk 110.

Referring back to FIG. 1, the focus servo determination unit 190 includes a cover layer period detection unit 190-1, a recording layer detection unit 190-2, a focus servo enable detection unit 190-3, and a focus servo enable determination unit 190-4.

The focus servo determination unit 190 operates only in a focus pull-in mode, that is, the focus servo determination unit 190 does not operate in other modes. In other words, when an operating mode of the optical disk drive enters into a focus pull-in mode, the controller 180 generates a control signal used to start an operation of the focus servo determination unit 190. The focus pull-in mode is enabled after a disk is loaded and determined, or after the optical disk drive is powered on with a disk loaded thereon and disk determination is then completed.

Figure 3A:
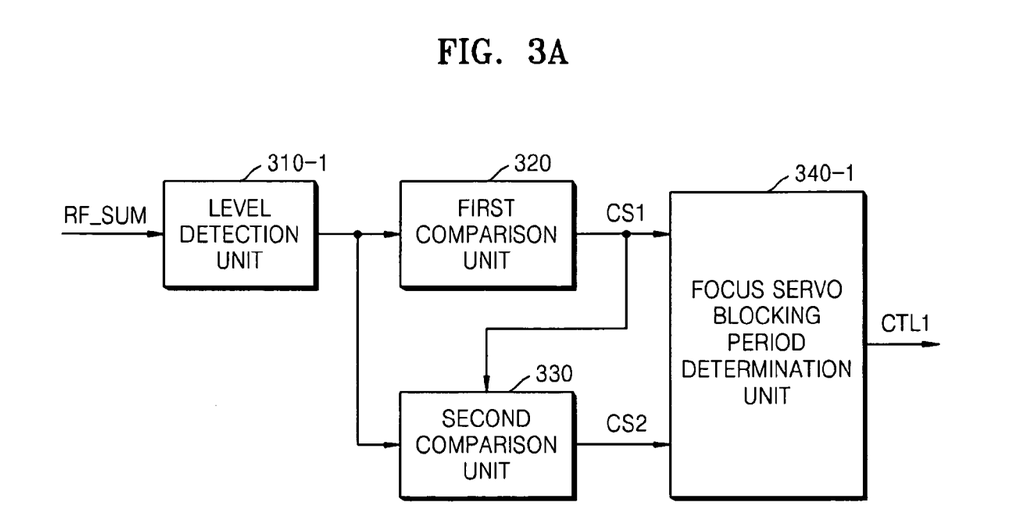
FIG. 3A is a block diagram of a cover layer period detection unit of the optical disk drive illustrated in FIG. 1, according to an exemplary embodiment of the present invention.
Figure 3B:
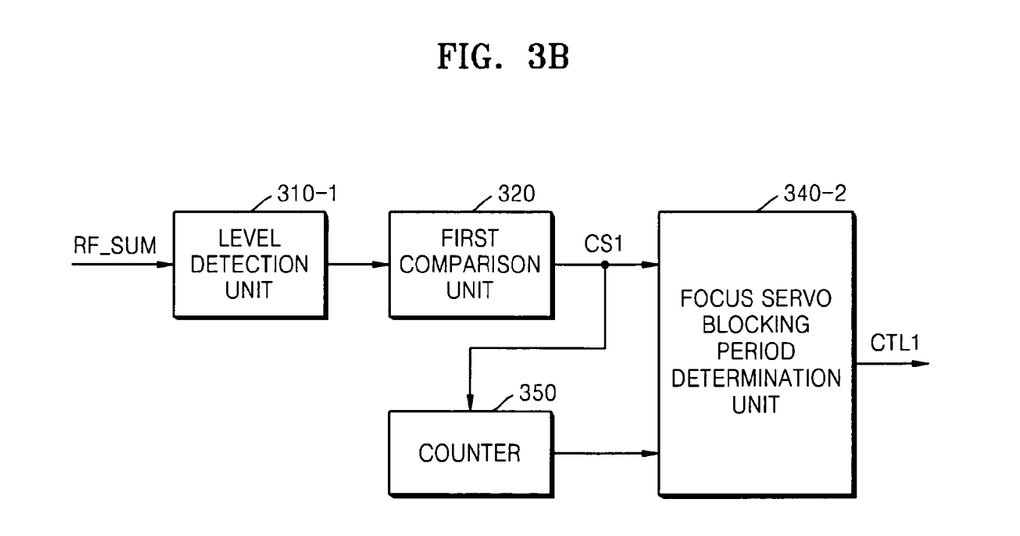
FIG. 3B is a block diagram of a cover layer period detection unit of the optical disk drive illustrated in FIG. 1, according to another exemplary embodiment of the present invention.

In a focus pull-in operation, the cover layer period detection unit 190-1 detects a period during which the focal point of the beam projected via the objective lens 120-6 of the pickup 120 is passing through the cover layer of the disk 110. FIGS. 3A and 3B are block diagrams of cover layer period detection units of the optical disk drive illustrated in FIG. 1, according to different exemplary embodiments of the present invention.

Referring to FIG. 3A, the cover layer period detection unit according to an exemplary embodiment of the present invention includes a level detection unit 310-1, a first comparison unit 320, a second comparison unit 330, and a focus servo blocking period determination unit 340-1.

Figure 9A:
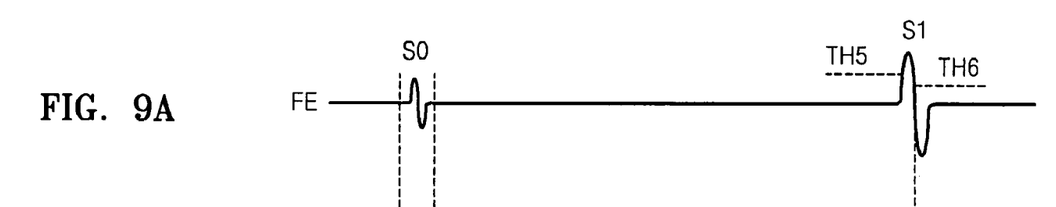
FIGS. 9A through 9F are waveform diagrams of major signals generated during a focus pull-in operation, according to an exemplary embodiment of the present invention.
Figure 9B:
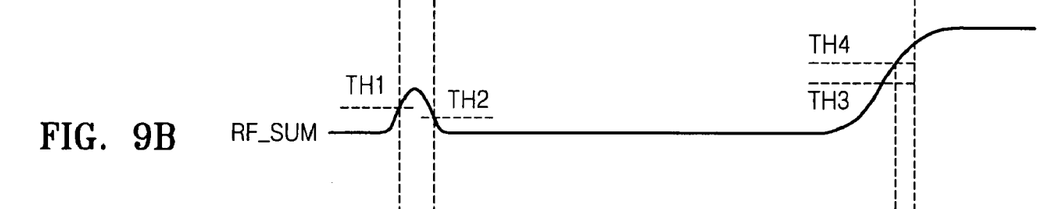

FIGS. 9A and 9B illustrate waveforms of a focus error signal FE and a sum signal RF_SUM, respectively, which are generated in the focus pull-in mode, according to an exemplary embodiment of the present invention.

Referring back to FIG. 3A, the level detection unit 310-1 detects, every sampling time, a magnitude of the sum signal RF_SUM generated by the signal processor 160, in the focus pull-in mode.

The first comparison unit 320 compares the magnitude of the sum signal RF_SUM detected by the level detection unit 310-1 with a first threshold value TH1. At the moment when the magnitude of the sum signal RF_SUM increases and reaches the first threshold value TH1, the first comparison unit 320 generates a first state signal CS1. The first threshold value TH1 is set to be a reference value for detecting a point in time at which the cover layer S0 of the disk 110 starts in a focus pull-in mode.

The second comparison unit 330 compares a magnitude of the sum signal RF_SUM detected by the level detection unit 310-1 since the generation of the first state signal CS1 with a second threshold value TH2. At the moment when the magnitude of the sum signal RF_SUM decreases and reaches the second threshold value TH2, the second comparison unit 330 generates a second state signal CS2. The second threshold value TH2 is set to be less than the first threshold value TH1 and is a reference value for detecting a point in time at which the cover layer S0 of the disk 110 ends in a focus pull-in mode.

The focus servo blocking period determination unit 340-1 generates a first control signal CTL1 only during a period between a point in time at which the first state signal CS1 is initially generated since the change of the operating mode of the optical disk drive to the focus pull-in mode and a point in time at which the second state signal CS2 is initially generated since the change of the operating mode of the optical disk drive to the focus pull-in mode. In other words, the focus servo blocking period determination unit 340-1 generates the first control signal CTL1 only once in the focus pull-in mode and ignores subsequent first and second state signals CS1 and CS2, in order for the first control signal CTL1 to be generated only from the cover layer S0 of the disk 110 not from the recording layer S1 thereof.

Figure 9C:
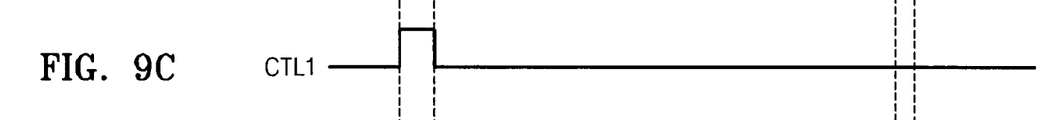

FIG. 9C illustrates the first control signal CTL1 generated by the focus servo blocking period determination unit 340-1. Referring to FIG. 9C, a period T1 during which the first control signal CTL1 is generated, that is, a period during which the first control signal CTL1 is maintained logic high, denotes a period during which the focal point of the beam projected by the pickup 120 passes through the cover layer S0 of the disk 110 in the focus pull-in mode. In other words, in the present invention, the period T1 during which the first control signal CTL1 is generated denotes a period during which execution of focus servo control is prevented.

Referring to FIG. 3B, the cover layer period detection unit according to another exemplary embodiment of the present invention includes the level detection unit 310-1, the first comparison unit 320, a counter 350, and a focus servo blocking period determination unit 340-2.

When the optical disk drive is in the focus pull-in mode, the level detection unit 310-1 detects, every sampling time, a magnitude of the sum signal RF_SUM generated by the signal processor 160.

The first comparison unit 320 compares the magnitude of the sum signal RF_SUM detected by the level detection unit 310-1 with the first threshold value TH1. At the moment when the magnitude of the sum signal RF_SUM increases and reaches the first threshold value TH1, the first comparison unit 320 generates the first state signal CS1. The first threshold value TH1 is set to be a reference value for detecting a point in time at which the cover layer S0 of the disk 110 starts in a focus pull-in mode.

The counter 350 counts the number of clock signals that oscillate with a specific frequency since the generation of the first state signal CS1.

The focus servo blocking period determination unit 340-2 generates the first control signal CTL1 only during a period between the point in time at which the first state signal CS1 is initially generated since the change of the operating mode of the optical disk drive to the focus pull-in mode and the point in time at which the value of the counter 350 reaches a particular value. In other words, the focus servo blocking period determination unit 340-2 generates the first control signal CTL1 only once in the focus pull-in mode and ignores a subsequent first state signal CS1, in order for the first control signal CTL1 to be generated only from the cover layer S0 of the disk 110 not from the recording layer S1 thereof. The particular value is set to be a value corresponding to the length of the period during which the beam projected by the pickup 120 passes through the cover layer S0 of the disk 110 in the focus pull-in mode.

The cover layer period detection units illustrated in FIGS. 3A and 3B are different in that the cover layer period detection unit illustrated in FIG. 3A determines the point in time at which the first control signal CTL1 is generated and the duration in which the first control signal CTL1 is generated, according to the detected magnitude of the sum signal RF_SUM, whereas the cover layer period detection unit illustrated in FIG. 3B determines the point in time at which the first control signal CTL1 is generated, according to the detected magnitude of the sum signal RF_SUM, and determines the duration in which the first control signal CTL1 is generated, according to the value of the counter 350.

Figure 4:
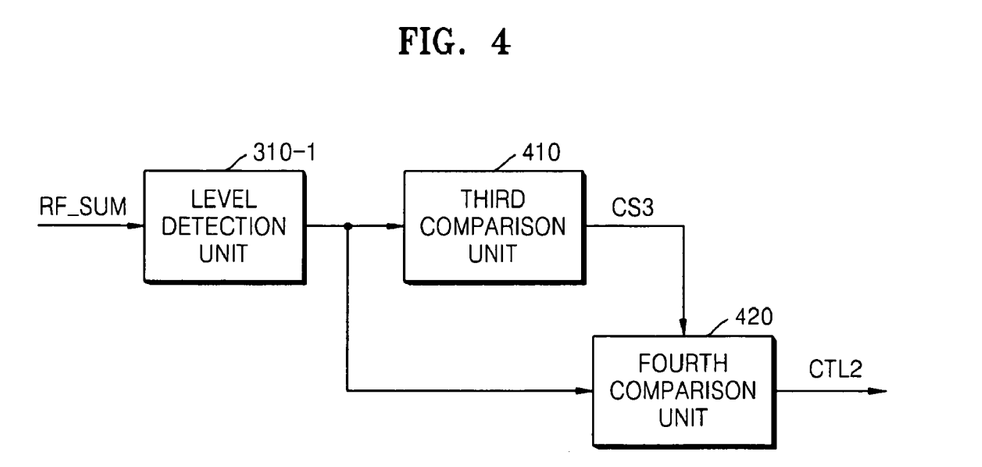
FIG. 4 is a block diagram of a recording layer detection unit of the optical disk drive illustrated in FIG. 1, according to an exemplary embodiment of the present invention.

FIG. 4 is a block diagram of the recording layer detection unit 190-2 of the optical disk drive illustrated in FIG. 1, according to an exemplary embodiment of the present invention.

Referring to FIG. 4, the recording layer detection unit 190-2 includes the level detection unit 310-1, a third comparison unit 410, and a fourth comparison unit 420.

When the optical disk drive is in the focus pull-in mode, the level detection unit 310-1 detects, every sampling time, a magnitude of the sum signal RF_SUM generated by the signal processor 160.

The third comparison unit 410 compares the magnitude of the sum signal RF_SUM detected by the level detection unit 310-1 with a third threshold value TH3, and generates a third state signal CS3 at the moment when the magnitude of the sum signal RF_SUM increases and reaches the third threshold value TH3. The third threshold value is set to be a value for detecting a point in time at which the recording layer S1 of the disk 110 starts in a focus pull-in mode.

The fourth comparison unit 420 compares a magnitude of the sum signal RF_SUM detected by the level detection unit 310-1 since the generation of the third state signal CS3 with a fourth threshold value TH4, and generates the second state signal CS2 at the moment when the magnitude of the sum signal RF_SUM increases and reaches the fourth threshold value TH4. The fourth threshold value TH4 is set to be greater than the third threshold value TH3 and serves as a reference value for determining that the beam emitted from the objective lens 120-6 is focused around the recording layer S1 of the disk 110 in the focus pull-in mode.

Figure 9D:
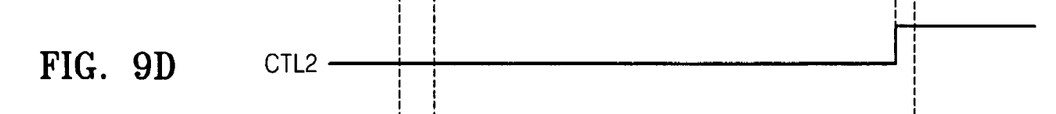

When the second control signal CTL2 starts to be generated, it indicates that the beam emitted from the objective lens 120-6 is focused around the recording layer S1 of the disk 110. FIG. 9D illustrates the second control signal CTL2 generated by the fourth comparison unit 420.

Figure 5:
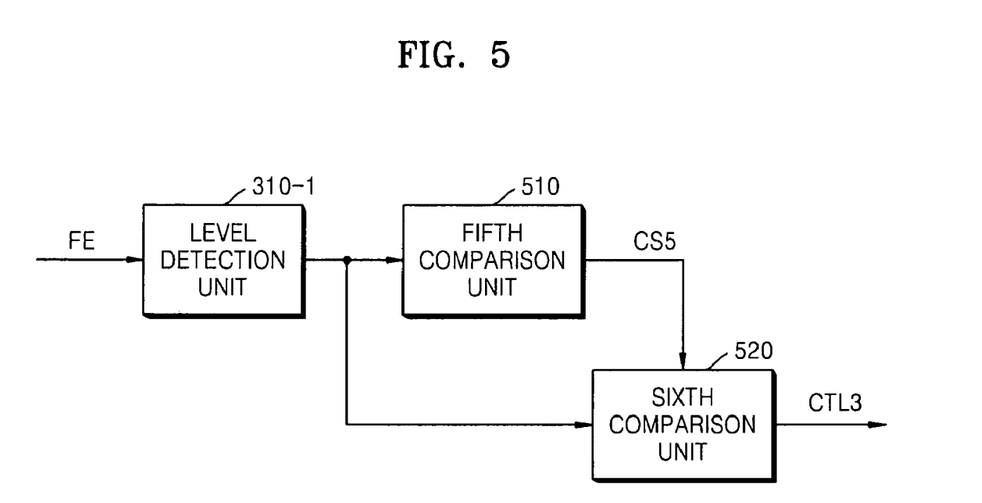
FIG. 5 is a block diagram of a focus servo enable detection unit of the optical disk drive illustrated in FIG. 1, according to an exemplary embodiment of the present invention.

FIG. 5 is a block diagram of the focus servo enable detection unit 190-3 of the focus servo determination unit 190 illustrated in FIG. 1, according to an exemplary embodiment of the present invention.

Referring to FIG. 5, the focus servo enable detection unit 190-3 includes a level detection unit 310-2, a fifth comparison unit 510, and a sixth comparison unit 520.

When the optical disk drive is in the focus pull-in mode, the level detection unit 310-2 detects, every sampling time, a magnitude of the focus error signal FE generated by the signal processor 160.

The fifth comparison unit 510 compares the magnitude of the focus error signal FE detected by the level detection unit 310-2 with a fifth threshold value TH5, and generates a fifth state signal CS5 at the moment when the magnitude of the focus error signal FE increases and reaches the fifth threshold value TH5. The fifth threshold value TH5 is set to be a reference value for determining that the focus error signal FE is generated from the recording layer S1 of the disk 110 in a focus pull-in mode.

Figure 9E:
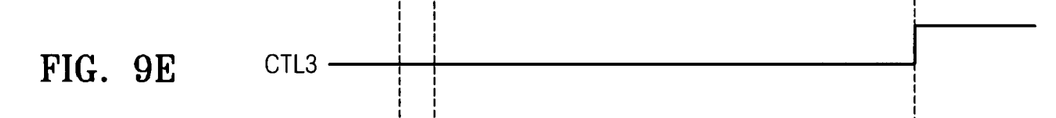

The sixth comparison unit 520 compares a magnitude of the focus error signal FE detected by the level detection unit 310-2 since the generation of the fifth state signal CS5 with a sixth threshold value TH6, and generates a third control signal CTL3 at the moment when the magnitude of the focus error signal FE decreases and reaches the sixth threshold value TH6. The sixth threshold value TH6 is set to be less than the fifth threshold value TH5 and serves as a reference value for determining that the beam emitted from the objective lens 120-6 is focused at a place very close to the recording layer S1 of the disk 110. In other words, the sixth threshold value TH6 is a reference value for detecting a point in time immediately before the focus error signal FE is almost zero-crossed. FIG. 9E illustrates the third control signal CTL3 generated by the sixth comparison unit 520.

Referring to FIGS. 1 and 9, the focus servo enable determination unit 190-4 of the focus servo determination unit 190 may be implemented as a logic circuit for generating a focus servo disable signal (not shown in FIG. 9) having a logic low state regardless of the generations of the second and third control signals CTL2 and CTL3 during the period T1 in which the first control signal CTL1 is logic high, and generating a focus servo enable signal FS_ENA having a logic high state when the third control signal CTL3 having a logic high state is generated while the second control signal CTL2 is logic high without generation of the first control signal CTL1 having a logic high state.

Figure 6:
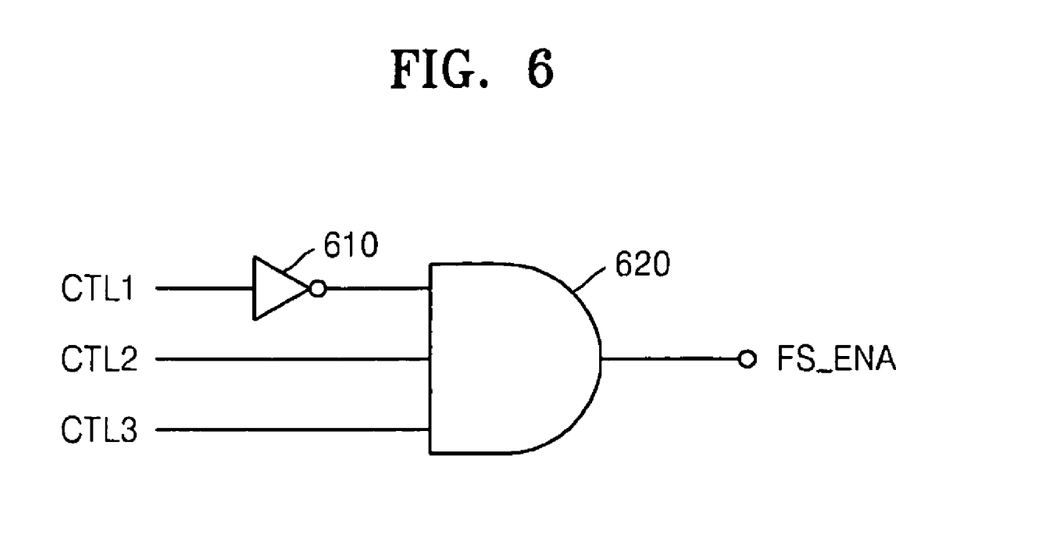
FIG. 6 is a block diagram of a focus servo enable determination unit of the optical disk drive illustrated in FIG. 1, according to an exemplary embodiment of the present invention.

FIG. 6 is a block diagram of the focus servo enable determination unit 190-4 of the optical disk drive illustrated in FIG. 1, according to an exemplary embodiment of the present invention. Referring to FIG. 6, the focus servo enable determination unit 190-4 includes an inverter 610 and an AND gate 620.

The inverter 610 is a logic circuit for inverting a logic state of the first control signal CTL1, and thus outputs a first control signal CTL1 having a logic low state only during the period T1 in which the first control signal CTL1 is logic high and outputs a first control signal CTL1 having a logic high state during other periods.

Figure 9F:
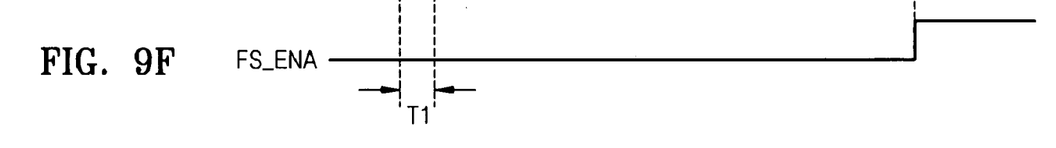

The AND gate 620 receives the output signal of the inverter 610 and the second and third control signals CTL2 and CTL3, and outputs a focus servo enable signal FS_ENA having a logic high state only when all of the received signals are logic high. FIG. 9F illustrates the focus servo enable signal FS_ENA generated by the AND gate 620.

Accordingly, the focus servo enable signal FS_ENA having a logic high state is prevented from being generated regardless of the generations of the second and third control signals CTL2 and CTL3 during the period T1 in which the first control signal CTL1 is logic high. In other words, focus servo control is prevented from being performed during the period T1 in which the focal point of the beam passes through the cover layer S0 of the disk 110 in the focus pull-in mode.

In the above-described exemplary embodiment of the present invention, for convenience of explanation, when it is said that first, second, and third control signals and a focus servo enable signal are generated, first, second, and third control signals and a focus servo enable signal having logic high states are generated. However, the present invention is not limited to these exemplary embodiments.

In addition, in the above-described exemplary embodiment of the present invention, the cover layer period detection unit 190-1 and the recording layer detection unit 190-2 share the level detection unit 310-1 which detects the magnitude of the sum signal RF_SUM.

Figure 7:
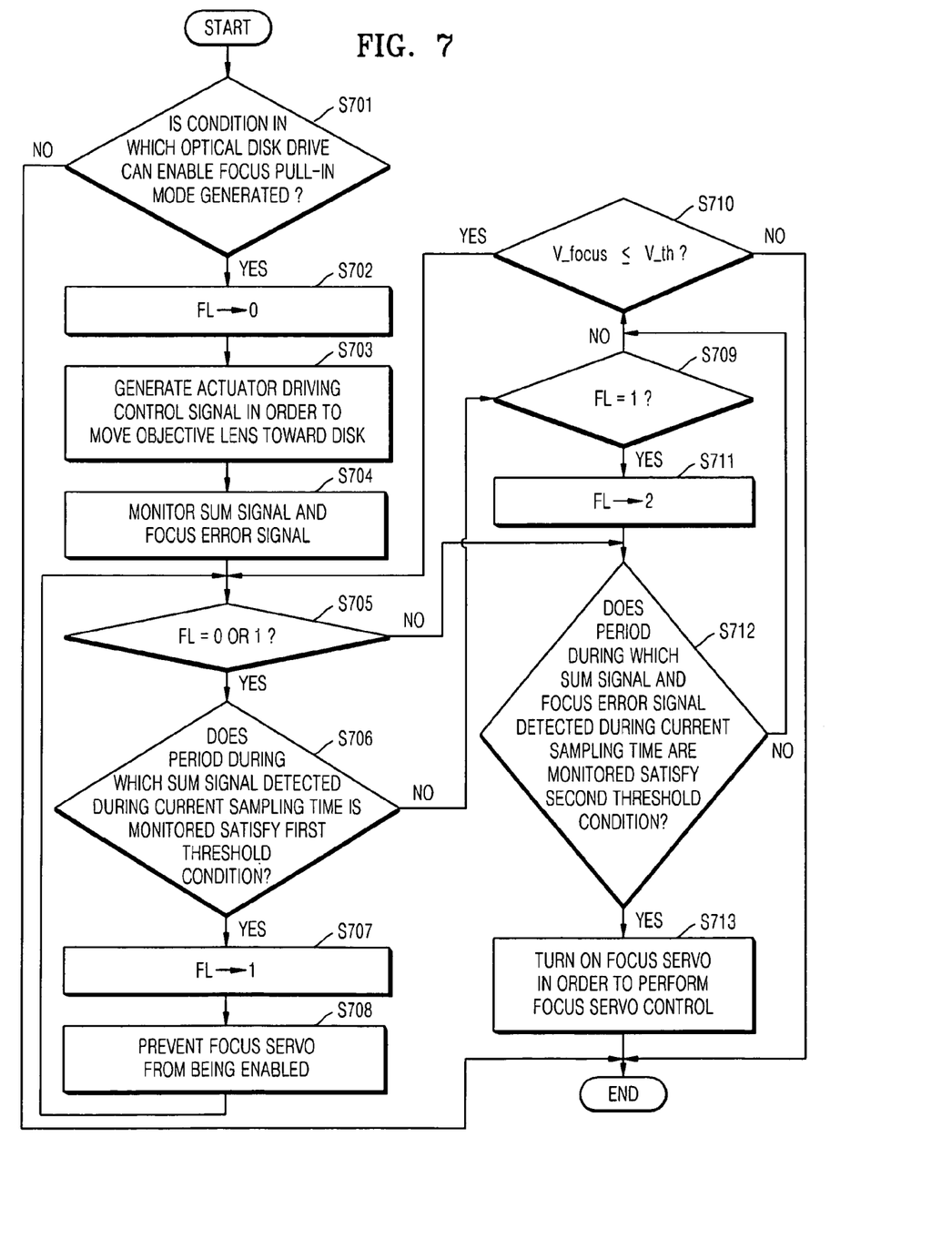
FIG. 7 is a flowchart of a focus servo controlling method using the optical disk drive of FIG. 1, according to an exemplary embodiment of the present invention.

FIG. 7 is a flowchart of a focus servo controlling method using the optical disk drive of FIG. 1, according to an exemplary embodiment of the present invention.

Referring to FIGS. 1 and 7, first, in operation S701, the controller 180 determines whether a condition in which the optical disk drive can enable a focus pull-in mode is generated. The focus pull-in mode is enabled immediately after the disk 110 is loaded and determined, or immediately after the optical disk drive is powered on with the disk 110 loaded thereon and disk determination is then completed.

When it is determined in operation S701 that the condition in which the optical disk drive can enable the focus pull-in mode is generated, 0 is written in a flag register (FL) (not shown) installed in the controller 180, in operation S702. For reference, in an exemplary embodiment of the present invention, when the value of the FL is 0, the value 0 indicates a state where the focal point of the beam emitted from the objective lens 120-6 does not yet reach the cover layer S0 of the disk 110 in the focus pull-in mode. When the value of the FL is 1, the value 1 indicates a state where the focal point of the beam emitted from the objective lens 120-6 is passing through the cover layer S0 of the disk 110 in the focus pull-in mode. When the value of the FL is 2, the value 2 indicates a state where the focal point of the beam emitted from the objective lens 120-6 has passed through the cover layer S0 of the disk 110 in the focus pull-in mode.

Thereafter, in operation S703, the controller 180 generates the actuator driving control signal in order to move the objective lens 120-6 of the pickup 120 toward the disk 110.

Next, in operation S704, the optical disk drive begins monitoring the sum signal RF_SUM and the focus error signal FE. The monitoring of the sum signal RF_SUM and the focus error signal FE will now be described in greater detail.

First, in operation S705, the controller 180 determines whether the value of the FL is 0 or 1 or neither 0 nor 1.

When it is determined in operation S705 that the value of the FL is 0 or 1, it is determined whether a period during which a sum signal RF_SUM detected during a current sampling time is monitored is included in a period of time that satisfies a first threshold condition, in operation S706. The period of time that satisfies the first threshold condition is set to be a period of time during which the focal point of the beam emitted from the objective lens 120-6 is passing through the cover layer of the disk 110. More specifically, the first threshold condition may be set to be an interval between the point in time at which the magnitude of the sum signal RF_SUM increases and reaches the first threshold value TH1 and the point in time at which the magnitude of the sum signal RF_SUM decreases and reaches the second threshold value TH2 set to be less than the first threshold value TH1. The first threshold value TH1 is set to be a value for detecting the point in time at which the cover layer S0 of the disk 110 starts in a focus pull-in mode. The second threshold value TH2 is set to be a value for detecting the point in time at which the cover layer S0 of the disk 110 ends in a focus pull-in mode.

If it is determined in operation S706 that the period during which the sum signal RF_SUM detected during the current sampling time is monitored is included in the period of time that satisfies the first threshold condition, 1 is written in the FL, in operation S707. Accordingly, when the value stored in the FL is 0, the value 0 is changed to the value 1. When the value stored in the FL is 1, the value 1 is maintained.

In operation S708, the controller 180 controls a focus servo not to be enabled to perform focus servo control while the value of the FL is 1. In other words, focus servo control is prevented from starting during the period in which the focal point of the beam is passing through the cover layer of the disk, which corresponds to the duration in which the value of the FL is maintained 1. Thereafter, the monitoring process is fed back to operation S704 in order to monitor a sum signal RF_SUM and a focus error signal FE detected during the next sampling time.

On the other hand, if it is determined in operation S706 that the period during which the sum signal RF_SUM detected during the current sampling period is monitored is not included in the period of time that satisfies the first threshold condition, it is determined whether the value stored in the FL is 1, in operation S709.

If it is determined in operation S709 that the value stored in the FL is not 1, it is determined whether an actuator driving voltage V_focus for focus pull-in is less than or equal to a threshold driving voltage V_th, in operation S710. The threshold driving voltage V_th is a threshold value set to prevent the objective lens 120-6 from colliding with the disk 110 during focus pull-in.

If it is determined in operation S710 that the actuator driving voltage V_focus is less than or equal to the threshold driving voltage V_th, the monitoring process goes back to operation S704. Otherwise, a focus pull-in operation (operations S702 through S712) is concluded in order to protect the optical disk drive.

On the other hand, if it is determined in operation S709 that the value stored in the FL is 1, 2 is written in the FL, in operation S711. In other words, the value 2 indicates a state where the focal point of the beam emitted from the objective lens 120-6 is moving toward the recording layer S1 of the disk 110 after completed passing through the cover layer S0 thereof.

Next, in operation S712, it is determined whether the period during which the sum signal RF_SUM and a focus error signal FE detected during the current sampling time are monitored is included in a point in time that satisfies a second threshold condition. The second threshold condition is a reference value for determining that the focal point of the beam emitted from the objective lens 120-6 exists in a place very close to the recording layer S1 of the disk 110. More specifically, the second threshold condition may be set to be a condition in which the magnitude of the sum signal RF_SUM reaches the third threshold value TH3 and reaches the fourth threshold value TH4 within a certain period of time and the magnitude of the focus error signal FE reaches the fifth threshold value TH5 and reaches the sixth threshold value TH6 within a certain period of time. The third threshold value TH3 is set to detect the point in time at which the recording layer S1 of the disk 110 starts in a focus pull-in mode. The fourth threshold value TH4 is greater than the third threshold value TH3 and is set to determine that the beam emitted from the objective lens 120-6 is focused around the recording layer S1 of the disk 110. The fifth threshold value TH5 is set to determine that the focus error signal FE is generated from the recording layer S1 of the disk 110 in a focus pull-in mode. The sixth threshold value TH6 is less than the fifth threshold value TH5 and is set to determine that the beam emitted from the objective lens 120-6 is focused at a place very close to the recording layer S1 of the disk 110.

In some cases, the second threshold condition may be set to be a condition in which the magnitude of the sum signal RF_SUM reaches the third threshold value TH3 and the magnitude of the focus error signal FE reaches the fifth threshold value TH5 and reaches the sixth threshold value TH6 within a certain period of time.

If it is determined in operation S712 that the period during which the sum signal RF_SUM and the focus error signal FE detected during the current sampling period are monitored satisfies the second threshold condition, the focus servo is enabled to perform focus servo control, in operation S713. On the other hand, if it is determined in operation S712 that the period during which the sum signal RF_SUM and the focus error signal FE detected during the current sampling period are monitored is not included in the point in time that satisfies the second threshold condition, operation S712 advances to operation S710.

On the other hand, if it is determined in operation S705 that the value of the FL is neither 0 nor 1, operation S705 advances to operation S712. In other words, when the value stored in the FL is neither 0 nor 1, this indicates that the value stored in the FL is 2. The value 2 stored in the FL indicates that the focal point of the beam emitted from the objective lens 120-6 has already passed through the cover layer S0 of the disk 110. Accordingly, there is no need to determine whether the period during which the sum signal RF_SUM detected during the current sampling time is monitored is included in the period of time that satisfies the first threshold condition, and thus operation S712 is immediately performed.

In this way, focus servo control can be prevented from starting on the cover layer S0 of the disk 110 during focus pull-in.

As described above, according to the present invention, accurate focus servo control can be performed on a recording layer of a disk by preventing execution of focus servo control on the cover layer thereof by using signals generated from an optical signal reflected by the disk during focus pull-in.

The present invention can be implemented as a method, an apparatus, and a system.

In addition to the above described exemplary embodiments, exemplary embodiments of the present invention can also be implemented through computer readable code/instructions in/on a medium, e.g., a computer-readable recording medium, to control at least one processing element to implement any of the above described exemplary embodiments. The medium can correspond to any medium/media permitting the storing of the computer readable code/instructions.

The computer readable code/instructions can be recorded/transferred on a medium in a variety of ways, with examples of the medium including computer-readable recording media. Examples of the computer-readable recording media include a magnetic recording apparatus, an optical disk, a magneto-optical disk, and/or a semiconductor memory (for example, RAM, ROM, Flash memory, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), a CD-R (Recordable)/Rewritable, DVD-R (Recordable/Rewritable), BDs, and HD DVDs. The computer-readable recording media may also be a distributed network, so that the computer readable code/instructions is/are stored and executed in a distributed fashion. Still further, as only an example, the processing element could include a processor or a computer processor, and processing elements may be distributed and/or included in a single device.

For example, exemplary embodiments can be implemented in computing hardware (computing apparatus) and/or software, such as (in a non-limiting example) any computer that can store, retrieve, process and/or output data and/or communicate with other computers. Software includes computer readable code/instructions. The computer readable code/instructions may form a program. The results produced by the implementation of the software can be displayed on a display of the computing hardware. A program/software implementing exemplary embodiments may be recorded on computer-readable media comprising computer-readable recording media discussed above.

Further, according to an aspect of exemplary embodiments, any combination of the described features, functions and/or operations can be implemented.

The program/software implementing exemplary embodiments may also be transmitted over transmission communication media. An example of transmission communication media includes a carrier-wave signal. A transmission communication media is different from computer-readable recording media.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A focus servo controlling method comprising:
    detecting a period of time that satisfies a first threshold condition in a focus pull-in mode, the first threshold condition set to determine a duration in which a focal point of an optical signal emitted from a pickup is passing through a cover layer of a disk, the determination made by using a first signal proportional to a detected portion of an optical signal reflected by the disk;
    generating a first state signal when the first signal first satisfies the first threshold condition;
    generating a second state signal when the first signal no longer satisfies the first threshold condition; and
    preventing focus servo control from being performed during a detected period of time between the first state signal and second state signal where the first signal first satisfies the first threshold condition since the operating mode entered into the focus pull-in mode,
    wherein a second threshold condition comprises a condition in which the magnitude of the first signal becomes equal to or greater than a third threshold value and after the lapse of a certain period of time becomes equal to or greater than a fourth threshold value set to be greater than the third threshold value.

2. The focus servo controlling method of claim 1, wherein the first signal comprises a sum signal obtained by summing signals detected by an optical detector of a pickup.

3. The focus servo controlling method of claim 1, wherein the period of time that satisfies the first threshold condition comprises a period between a point in time at which a magnitude of the first signal increases and reaches a first threshold value set to determine a point in time at which the cover layer of the disk starts and a point in time at which the magnitude of the first signal decreases and reaches a second threshold value set to determine a point in time at which the cover layer of the disk ends, wherein the second threshold value is less than the first threshold value.

4. The focus servo controlling method of claim 1, wherein the period of time that satisfies the first threshold condition comprises a period between the point in time at which the magnitude of the first signal increases and reaches the first threshold value set to determine a point in time at which the cover layer of the disk starts and a point in time at which a certain period of time has lapsed since the point in time at which the magnitude of the first signal increases and reaches the first threshold value.

5. The focus servo controlling method of claim 1, further comprising starting focus servo control when it is determined using the first signal and a focus error signal that the focal point of the optical signal emitted from the pickup reaches a recording layer of the disk, after the lapse of the period of time that first satisfies the first threshold condition.

6. The focus servo controlling method of claim 1, wherein the focus servo control is performed at a point in time at which each of the first signal and the focus error signal satisfies a second threshold condition and a third threshold condition which are set to determine a duration in which the focal point of the optical signal emitted from the pickup is passing through the recording layer of the disk.

7. The focus servo controlling method of claim 6, wherein the second threshold condition comprises a condition in which the magnitude of the first signal becomes equal to or greater than a third threshold value set to determine a point in time at which the recording layer of the disk starts.

8. The focus servo controlling method of claim 6, wherein the third threshold condition comprises a condition in which the magnitude of the focus error signal becomes equal to or greater than a fifth threshold value set to determine that the focus error signal is generated from the recording layer of the disk and then becomes less than or equal to a sixth threshold value set to be less than the fifth threshold value.

9. A focus servo controlling apparatus comprising:
    a cover layer period detection unit to generate a first control signal during a period in which a focal point of an optical signal emitted from a pickup is passing through a cover layer of a disk, by using a first signal proportional to a detected portion of an optical signal reflected by the disk in a focus pull-in mode;
    a recording layer detection unit to generate a second control signal during a period in which the focal point of the optical signal emitted from the pickup is approaching a recording layer of the disk, by using the first signal;
    a focus servo enable detection unit to generate a third control signal at a focus servo enable point in time, by using a focus error signal; and
    a focus servo enable determination unit to prevent focus servo control from being performed regardless of generations of the second and third control signals while the first control signal is being generated, and to perform focus servo control when the third control signal is generated while the second control signal is being generated without generation of the first control signal.

10. The focus servo controlling apparatus of claim 9, wherein the cover layer period detection unit comprises:
    a level detection unit to detect a magnitude of the first signal in the focus pull-in mode;
    a first comparison unit to compare the magnitude of the first signal detected by the level detection unit with a first threshold value and to generate a first state signal at the moment when the magnitude of the first signal increases and reaches the first threshold value;
    a second comparison unit to compare a magnitude of the first signal detected by the level detection unit since the generation of the first state signal with a second threshold value set to be less than the first threshold value and to generate a second state signal at the moment when the magnitude of the first signal decreases and reaches the second threshold value; and
    a focus servo blocking period determination unit to generate the first control signal during a period between a point in time at which the first state signal is initially generated and a point in time at which the second state signal is initially generated.

11. The focus servo controlling apparatus of claim 9, wherein the cover layer period detection unit comprises:
a level detection unit to detect a magnitude of the first signal in a focus pull-in mode;
a first comparison unit to compare the magnitude of the first signal detected by the level detection unit with a first threshold value and to generate a first state signal at the moment when the magnitude of the first signal increases and reaches the first threshold value;
a counter to count the number of clock signals generated since the point in time at which the first state signal is generated; and
a focus servo blocking period determination unit to generate the first control signal during a period between a point in time at which the first state signal is initially generated and a point in time at which the value of the counter reaches a predetermined value.

12. The focus servo controlling apparatus of claim 9, wherein the recording layer detection unit comprises:
a level detection unit to detect a magnitude of the first signal in the focus pull-in mode;
a third comparison unit to compare a magnitude of the first signal detected by the level detection unit after the lapse of the duration in which the first control signal is generated with a third threshold value, and to generate a third state signal at the moment when the magnitude of the first signal increases and reaches the third threshold value; and
a fourth comparison unit to compare a magnitude of the first signal detected by the level detection unit since the generation of the third state signal with a fourth threshold value set to be greater than the third threshold value, and to generate the second control signal at the moment when the magnitude of the first signal increases and reaches the fourth threshold value.

13. The focus servo controlling apparatus of claim 9, wherein the focus servo enable detection unit comprises:
a level detection unit to detect a magnitude of the first signal in the focus pull-in mode;
a fifth comparison unit to compare the magnitude of the first signal detected by the level detection unit with a fifth threshold value and to generate a fifth state signal at the moment when the magnitude of the first signal increases and reaches the fifth threshold value; and
a sixth comparison unit to compare a magnitude of the first signal detected by the level detection unit since the generation of the fifth state signal with a sixth threshold value set to be less than the fifth threshold value, and to generate the second control signal at the moment when the magnitude of the first signal decreases and reaches the sixth threshold value.

14. The focus servo controlling apparatus of claim 9, wherein the focus servo enable determination unit comprises:
an inverter to invert a logic state of the first control signal; and
an AND gate to generate a focus servo enable signal by logically multiplying an output signal of the inverter and the second and third control signals.

15. An optical disk drive comprising:
a pickup to project an optical signal to a disk via an objective lens and to detect an optical signal reflected by the disk, the pickup comprising an actuator to move the objective lens according to an actuator driving control signal;
a signal processor to generate a focus error signal and a first signal by using optical signals detected by the pickup, wherein the first signal is proportional to a detected portion of the optical signal reflected by the disk;
a focus servo determination unit to prevent a focus servo enable signal from being generated while a focal point of the optical signal projected via the objective lens is passing through a cover layer of the disk when the optical disk drive is in a focus pull-in mode, by using the first signal, and to generate the focus servo enable signal when the focal point of the optical signal projected via the objective lens reaches a recording layer of the disk, by using the first signal and the focus error signal; and
a controller to generate the actuator driving control signal for moving the objective lens of the pickup in a direction perpendicular to a top surface of the disk, in the focus pull-in mode, and to perform focus servo control when the focus servo enable signal is generated,
wherein the focus servo determination unit comprises:
a cover layer period detection unit to generate a first control signal during a period in which a focal point of an optical signal emitted from a pickup is passing through a cover layer of a disk, by using the first signal, in the focus pull-in mode;
a recording layer detection unit to generate a second control signal during a period in which the focal point of the optical signal emitted from the pickup is approaching a recording layer of the disk, by using the first signal;
a focus servo enable detection unit to generate a third control signal at a focus servo enable point in time, by using the focus error signal; and
a focus servo enable determination unit to generate a focus servo disable signal regardless of generations of the second and third control signals while the first control signal is being generated, and to generate a performing a focus servo enable signal when the third control signal is generated while the second control signal is being generated without generation of the first control signal.

16. The optical disk drive of claim 15, wherein the first signal comprises a sum signal obtained by summing signals detected by an optical detector of the pickup.

17. The optical disk drive of claim 15, wherein the cover layer period detection unit comprises:
a level detection unit to detect a magnitude of the first signal in the focus pull-in mode;
a first comparison unit to compare the magnitude of the first signal detected by the level detection unit with a first threshold value and to generate a first state signal at the moment when the magnitude of the first signal increases and reaches the first threshold value;
a second comparison unit to compare a magnitude of the first signal detected by the level detection unit since the generation of the first state signal with a second threshold value set to be less than the first threshold value and to generate a second state signal at the moment when the magnitude of the first signal decreases and reaches the second threshold value; and
a focus servo blocking period determination unit to generate the first control signal during a period between a point in time at which the first state signal is initially generated and a point in time at which the second state signal is initially generated.

18. The optical disk drive of claim 15, wherein the cover layer period detection unit comprises:
a level detection unit to detect a magnitude of the first signal in the focus pull-in mode;

a first comparison unit to compare the magnitude of the first signal detected by the level detection unit with a first threshold value and to generate a first state signal at the moment when the magnitude of the first signal increases and reaches the first threshold value;

a counter to count the number of clock signals generated since the point in time at which the first state signal is generated; and a focus servo blocking period determination unit to generate the first control signal during a period between a point in time at which the first state signal is initially generated and a point in time at which the value of the counter reaches a predetermined value.

19. The optical disk drive of claim 15, wherein the recording layer detection unit comprises:

a level detection unit to detect a magnitude of the first signal in the focus pull-in mode;

a third comparison unit to compare a magnitude of the first signal detected by the level detection unit after the lapse of the duration in which the first control signal is generated with a third threshold value, and to generate a third state signal at the moment when the magnitude of the first signal increases and reaches the third threshold value; and a fourth comparison unit to compare a magnitude of the first signal detected by the level detection unit since the generation of the third state signal with a fourth threshold value set to be greater than the third threshold value, and to generate the second control signal at the moment when the magnitude of the first signal increases and reaches the fourth threshold value.

20. The optical disk drive of claim 15, wherein the focus servo enable detection unit comprises:

a level detection unit to detect a magnitude of the first signal in the focus pull-in mode;

a fifth comparison unit to compare the magnitude of the first signal detected by the level detection unit with a fifth threshold value and to generate a fifth state signal at the moment when the magnitude of the first signal increases and reaches the fifth threshold value; and a sixth comparison unit to compare a magnitude of the first signal detected by the level detection unit since the generation of the fifth state signal with a sixth threshold value set to be less than the fifth threshold value, and to generate the third control signal at the moment when the magnitude of the first signal decreases and reaches the sixth threshold value.

21. The focus servo controlling method of claim 2, wherein the signals detected by the optical detector of the pickup are at least one of a main bean and a sub beam.

22. At least one non-transitory computer-readable recording medium storing instructions that control at least one processing element to implement the method of claim 1.

* * * * *